United States Patent Office 3,585,156
Patented June 15, 1971

3,585,156
CATALYST MODIFIERS FOR DIHYDROPYRANYL FOAMABLE COMPOSITIONS
Norman Dennis Hall, Cornwall, Ontario, Canada, assignor to Canadian Industries Limited, Montreal, Quebec, Canada
No Drawing. Filed Jan. 27, 1969, Ser. No. 794,362
Claims priority, application Great Britain, Feb. 12, 1968, 6,819/68
Int. Cl. C08c 17/08
U.S. Cl. 260—2.5R
8 Claims

ABSTRACT OF THE DISCLOSURE

Specific amine catalyst modifiers for controlling the polymerization of acid catalyzed foamable compositions containing dihydropyranyl compounds. The catalyst modifiers slow down the polymerization reaction and provide well cured foamed cellular polymeric materials.

This invention relates to a process for the preparation of foamed cellular polymeric materials.

In British Pat. No. 991,970 published on May 12, 1965, there are disclosed foamed cellular polymeric materials which are the products of the foaming reaction of dihydropyranyl-group containing materials polymerized in the presence of an acidic catalyst and volatile blowing agent. These cellular materials can be foamed in place to form useful insulating masses. However, the polymerization reaction tends to proceed rapidly, giving rise to problems in filling the space to be occupied by the foam. For best processing of the foamable compositions, the addition of the catalyst should be followed by a substantial induction period and a substantial period in which the foam is rising. Also for satisfactory utilization of the foaming compositions, the polymerization reaction should proceed at such a rate that the foam attains a fully expanded form at the same time as the polymer becomes fully cured. Thus the use of catalyst modifiers to retard the rate of the polymerization reaction may result in a fully expanded but only partially cured foam. For example, the use of dimethyl cocoamine to retard the reaction results in partially cured foams unless a proportionately large amount of catalyst is employed, in which case the induction periods and rise times are not modified.

It has now been found that the polymerization reaction of dihydropyranyl group-containing foamable compositions can be slowed down to give longer induction periods and rise times accompanied by the production of well cured cellular products if certain specific amines are employed as catalyst modifiers. The use of these amine catalyst modifiers results in well cured cellular materials as evidenced by lack of tackiness and absence of shrinkage.

It is therefore the primary object of this invention to provide a process for controlling the foaming reaction of dihydropyranyl group-containing foamable compositions. Additional objects will appear hereinafter.

The process of this invention comprises mixing:
(A) at least one polymerizable dihydropyranyl compound of the generic formula

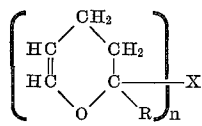

where $n$ is an integer having a value of 2 or 3, R is hydrogen, a lower alkyl radical or the carboxaldehyde radical and X is a linking group having a valence equal to $n$.

(B) an acidic catalyst capable of promoting the polymerization reaction of (A), (C) a catalyst modifier selected from the group consisting of diphenylamine, phenyl-$\alpha$-naphthylamine, phenyl-$\beta$-naphthylamine, sym.-di-$\beta$-naphthyl - p - phenylenediamine, diphenyl - p - phenylenediamine, isopropoxy diphenylamine, N-methyldiphenylamine and m-nitroaniline, and (D) a foaming agent vaporizing at the temperature of the polymerization reaction of (A), and allowing the mixture naturally to self-expand into a foamed cellular polymeric material.

Optionally the foamable mixture may contain as additional ingredient a material reactive with the dihydropyranyl double bond such as a polyhydric phenol, a polyhydric alcohol, an epoxidized material and an $\alpha,\beta$-monoethylenically unsaturated compound.

When the mixture contains a polyhydric phenol or polyhydric alcohol as additional ingredient, it may contain also an organic polyisocyanate.

The foamable mixture may also include surfactants, flame retardants, dyes, fillers, stabilizers, antioxidants, plasticizers and viscosity modifiers.

The catalyst is present in amounts in the range 0.005% to 2.0% by weight of the mixture but these amounts are not limiting since the amount of catalyst should be adjusted to the temperature of the operation and the foam induction period required.

The catalyst modifier is present in amounts not greater than 1% by weight of the mixture. It has been found that with this proportion of catalyst modifier, the amount of catalyst employed need be increased not more than 5% above the normal amount used without the modifier.

The foaming agent comprises from 2% to 30% by weight of the mixture.

When a dihydropyranyl group-reactive ingredient is employed in the mixture, it is present in such an amount that the number of dihydropyranyl groups is always greater than the number of dihydropyranyl group-reactive groups.

When an organic polyisocyanate is employed as additional ingredient, it may comprise up to 10% by weight of the mixture.

Examples of suitable dihydropyranyl compounds are:
3,4 - dihydro - 2H - pyran - 2 - methyl - (3,4-dehydro-2H-pyran-2-carboxylate) of formula

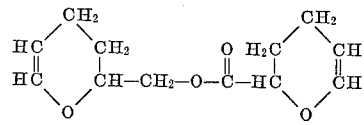

1,2 - ethanedioxy-bis(3',4' -dihydro - 2H - pyran - 2' carbonyl) of formula

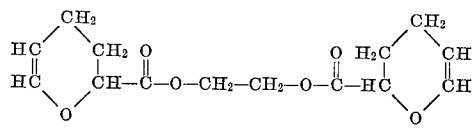

bis-(3,4-dihydro-2H-pyran-2-methyl) succinate of formula

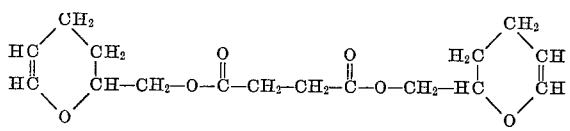

1,2-bis(3',4'-dihydro-2'H-pyran-2'-oxy)ethane of formula

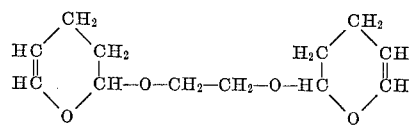

3,4 - dihydro-2H-pyran - 2,2 - dimethyl-(3,4-dihydro-2H-pyran-2-carboxylate-2-methyl) of formula

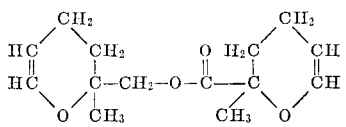

1,2-ethanedioxy-bis(3',4'-dihydro-2'-H-pyran-2'-carbonyl) of formula

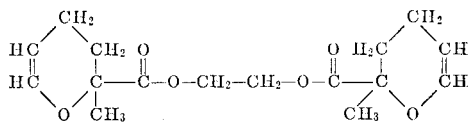

1,2 - bis(3',4'-dihydro-2'-H-pyran - 2' - methyl - 2' - oxy) ethane of formula

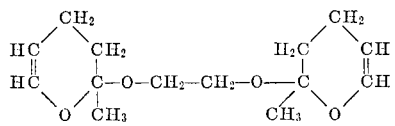

1,1 - bis(3',4' - dihydro - 2' - H-pyran-2'-methyl-2'-oxy) ethane of formula

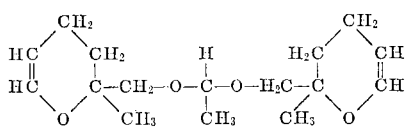

and the trimeric aldol condensation product of 3,4-dihydro-2H-pyran-2-carboxaldehyde, comprising the three compounds (1) 2-(2-formyl-3,4-dihydro-2H-pyran)-2-(3,4-dihydro-2H-pyran)carbinol, of formula

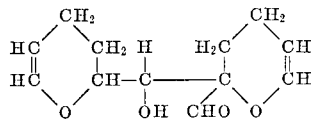

(2) 5,8,10-trioxa - 7 - hydroxy-9,11-bis-2-(3,4-dihydro-2H-pyran)-spiro[5,5]undec-3-ene of formula

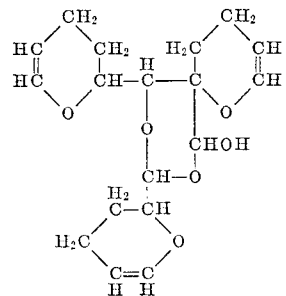

and (3) 1-hydroxy-1-[2-(3,4-dihydro - 2H - pyran)]-1'-[2'-(3',4'-dihydro - 2H - pyran)]-1'-[2''-(2''-formyl-3'',4''-dihydro-2H-pyran)]dimethyl ether of formula

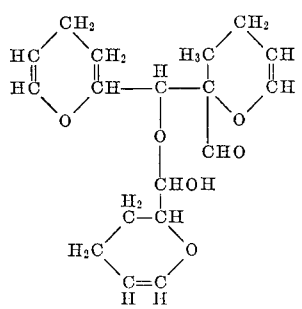

Suitable acidic catalysts for promoting the polymerization reaction of the foamable mixture of this invention are the strong proton donating acids such as p-toluenesulphonic acid and Lewis acids such as borontrifluoride conveniently employed as the etherate, $BF_3(C_2H_5)_2O$. Other materials suitable as acidic catalysts are ferric chloride, stannic chloride, phosphorous pentachloride, phosphoric acid, perchloric acid, acetic acid, trifluoroacetic acid, trichloroacetic acid, fluoboric acid, borontrifluoride dihydrate, hydrogen fluoride, antimony pentafluoride, hexafluorophosphoric acid, lead fluoborate, antimony fluoborate, fluosilicic acid, sulphuric acid and silicotungstic acid.

Foaming agents suitable for use in the foaming mixture are those which are soluble or dispersible in the other ingredients of the foaming mixture and are sufficiently volatile that they evaporate during the formation of the foamed polymeric material. The heat of the catalyzed polymerization reaction causes the foaming agent to boil, and the vapour forms bubbles which expand during the polymerization reaction to give a low density, foamed polymerized mass. Preferred foaming agents are the halogenated hydrocarbons such as trichloromonofluoromethane, dichlorotetrafluoroethane, trichlorotrifluoroethane, dichlorodifluoromethane, dibromodifluoromethane, dichlorohexafluorocyclobutane, methylene chloride, chloroform, trichloroethylene, carbon tetrachloride and perchloroethylene.

Suitable polyhydric phenol ingredients are resorcinol, phloroglucinol, catechol, hydroquinone and 2:2-di-p-hydroxyphenyl propane.

Suitable polyhydric alcohol ingredients are ethylene glycol, glycerol, diethylene glycol, 1,5-pentanediol, 1,2,6-hexanetriol, polypropylene glycols, castor oil, blown castor oil, and diglyceryltetrachlorophthalate.

Epoxidized materials suitable as ingredients are dipentene dioxide, vinyl cyclohexene dioxide, polyallylglycidyl ether, diphenylpropanediglycidyl ether, epoxidized polybutadiene and the resinous condensate of epichlorohydrin and 2:2-di-p-hydroxyphenyl propane.

$\alpha,\beta$-monoethylenically unsaturated compounds suitable as ingredients are 3,4-dihydro-2H-pyran, 2-ethoxy-3,4-dihydro-2H-pyran, 2-methyl-3,4-dihydro - 2H - pyran, 2-phenyl-3,4-dihydro-2H-pyran, 1-decene, vinyl stearate, lauryl vinyl ether, dibutyl maleate, vinyl cyclohexene, alkyl acrylates, alkyl methacryates and styrene.

Suitable organic polyisocyanate ingredients are tolylene 2,4-diisocyanate, mixtures of tolylene 2,4- and 2,6-diisocyanates, diphenylmethane diisocyanate, 4,4'-diisocyanate-3-methyl-diphenylmethane, m- and p-phenylene diisocyanates, and chlorophenylene-2,4-diisocyanate.

Preferable surfactants for use in the foamable mixture are those of the silicone type, examples of which are disclosed in Belgian Patents Nos. 582,362 and 584,089 being of the siloxane-oxyalkylene copolymer type.

Suitable flame retardants for use in the foamable mixture are trichloroethylphosphate, tris(2,3-dibromopropyl)phosphate, 2:2-bis - (3',5'-dibromo-4'-hydroxyphenyl)propane, brominated castor oil and polyvinyl chloride both with and without antimony oxide.

When a batch procedure is employed for preparing the cellular polymeric materials of this invention, the ingredients may be mixed by stirring in a vessel and then quickly poured into a mould. They may also be mixed in the space which is to be filled with foam if it is suitably shaped. When the cellular materials are prepared by a continuous procedure, the foamable mixture is divided into portions to segregate the catalyst from the dihydropyranyl ingredient and the portions introduced separately into the mixing head of the foam dispensing machine. It is generally desirable to employ a surfactant as ingredient of the foamable mixture. In many recipes it has been found that reduction of the surfactant to a point where the bubbles just burst as polymerization is complete give foams of the known "open-cell" structure.

The cellular materials of this invention are eminently suited for heat insulating and sound absorbing purposes, either in closed cavities or as enveloping blankets.

ing mixtures so as to give tack-free, low shrinkage foam the induction period and rise time is comparable to that of foamable compositions without a catalyst modifier.

TABLE

Mixture A contains the catalyst modifier
Mixture B contains the catalyst

| | | Grams | | | Seconds | | | |
|---|---|---|---|---|---|---|---|---|
| Ex. | Catalyst modifier | Weight of catalyst modifier in mixture A | Weight of mixture B in foaming composition | Weight of mixture B in foaming composition | Induction period of foam | Rise time of foam | Duration of tackiness of foam after rise, minutes | Shrinkage of foam after 20 hours, percent decrease in volume |
| 1 | None | None | 367.5 | 85 | 15 | 6 | Tack free | <2 |
| 2 | Diphenylamine | 1.4 | 368.9 | 88 | 41 | 15 | ___do___ | <2 |
| 3 | Phenyl-α-naphthylamine (Neozone A) | 1.4 | 368.9 | 87 | 20 | 12 | ___do___ | <2 |
| 4 | Phenyl-β-naphthylamine (Neozone D) | 2.3 | 369.8 | 87 | 26 | 18 | ___do___ | <2 |
| 5 | Sym-di-β-naphthyl-p-phenylenediamine (Agerite White) | 2.3 | 369.8 | 88 | 24 | 13 | ___do___ | <2 |
| 6 | Phenyl-β-naphthylamine and diphenyl-p-phenylenediamine (Agerite HP) | 1.4 | 368.9 | 88 | 37 | 15 | ___do___ | <2 |
| 7 | Phenyl-β-naphthylamine and isopropoxy diphenylamine and diphenyl-p-phenylenediamine (Agerite Hipar) | 1.4 | 368.9 | 88 | 35 | 13 | ___do___ | <2 |
| 8 | N-methyldiphenylamine | 1.4 | 368.9 | 93 | 29 | 16 | ___do___ | <2 |
| 9 | Dimethyl cocoamine ("Armeen" DMCD) | 1.4 | 368.9 | 98 | 40 | 19 | 35–40 | 30 |
| 10 | Do | 1.4 | 368.9 | 105 | 27 | 11 | 3–5 | 10 |
| 11 | Dimethyl cocoamine ("Armeen" DMCl) | 1.4 | 368.9 | 112 | 17 | 7 | 2–3 | <2 |

The foamable mixtures of this invention containing catalyst modifiers have longer induction and rise periods than prior art mixtures of this type and expand to form fully cured cellular polymeric materials.

The invention is additionally illustrated by the following examples but it is to be understood that the scope of the invention is not limited to the embodiments shown therein.

EXAMPLES 1–11

A series of eleven foamed cellular polymeric materials was prepared differing only in the nature of the catalyst modifier. The ingredients were first prepared in two separate portions, Mixture A and Mixture B, as follows:

Mixture A

Grams 3,4-dihydro-2H-pyran - 2 - methyl - (3,4-dihydro-2H-pyran-2-carboxylate) _____ 135.0
Trimeric aldol condensation product of 3,4-dihydro-2H-pyran-2-carboxaldehyde _____ 135.0
Trichloromonofluoromethane _____ 65.5
Dichlorodifluoromethane _____ 4.5
Castor oil _____ 27.0
Siloxane oxyalkylene copolymer type silicone surfactant (Dow Corning–193) _____ 0.5
Catalyst modifier as indicated in table.

Mixture B

Grams
Tris-(2,3-dibromopropyl) phosphate _____ 41.2
Diphenylmethane diisocyanate ("Mondur" MR) __ 29.4
Trichloromonofluoromethane _____ 25.9
Borontrifluoride etherate _____ 3.5

Mixture A in the amount indicated in the table, was placed in a container and stirred vigorously for 20 to 25 seconds by means of a mechanical stirrer. Mixture B, in the amount indicated in the table, was added over a period of 3 to 4 seconds. The combined mixture was stirred for an additional 4 to 5 seconds and poured into a mould. The induction period, rise time, duration of tackiness of foam after completion of rise and the shrinkage of the foam after 20 hours were measured. The values are shown in the table. It can be seen that the specific amine catalyst modifiers increase the induction periods and rise times while still maintaining tack free and low shrinkage foams. The dimethyl cocoamine ("Armeen" DMCD) in distinction gives tacky, shrinking foams when it increases the induction period and rise time. When the catalyst-containing Mixture B is added in greater proportions to the dimethyl cocoamine-containing mixtures so as to give tack-free, low shrinkage foam the induction period and rise time is comparable to that of foamable compositions without a catalyst modifier.

What I claim is:

1. A process for the preparation of foamed cellular polymeric materials which comprises mixing
    (A) At least one polymerizable dihydropyranyl compound of the generic formula

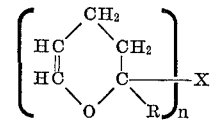

where $n$ is an integer having a value of 2 or 3, R is hydrogen, a lower alkyl radical or the carbonaldehyde radical and X is a linking group having a valence equal to $n$,
    (B) 0.005% to 2.0% by weight of the mixture of an acidic catalyst capable of promoting the polymerization reaction of (A),
    (C) 0.2% to 1.0% by weight of the mixture of a catalyst modifier selected from the group consisting of diphenylamine, phenyl-α-naphthylamine, phenyl-β-naphthylamine, sym. di-β-naphthyl-p-phenylenediamine, diphenyl-p-phenylenediamine, isopropoxy diphenylamine, N-methyl-diphenylamine and m-nitroaniline, and
    (D) 2% to 30% by weight of the mixture of a foaming agent vaporizing at the temperature of the polymerization reaction of (A), and allowing the mixture naturally to self-expand into a foamed cellular polymeric material.

2. A process as claimed in claim 1 wherein the mixture contains 3,4 - dihydro - 2H-pyran-2-methyl-(3,4-dihydro-2H-pyran-2-carboxylate) and the trimeric aldol condensation product of 3,4-dihydro-2H-pyran-2-carboxaldehyde.

3. A process as claimed in claim 1 wherein the mixture contains as additional ingredient a dihydropyranyl group-reactive material in such amount that the number of dihydropyranyl groups is always greater than the number of dihydropyranyl group-reactive groups.

4. A process as claimed in claim 3 wherein the dihydropyranyl group-reactive ingredient is selected from the group consisting of castor oil and diphenylmethane diisocyanate.

5. A process as claimed in claim 1 wherein the acidic catalyst is selected from the group consisting of Lewis acids and strong proton-donating acids.

6. A process as claimed in claim 5 wherein the acidic catalyst is borontrifluoride etherate.

7. A process as claimed in claim 1 wherein the foaming agent is a mixture of trichloromonofluoromethane and dichlorodifluoromethane.

8. A process as claimed in claim 1 wherein the mixture contains a siloxane oxyalkylene copolymer surfactant.

References Cited

UNITED STATES PATENTS

| | | | |
|---|---|---|---|
| 3,311,573 | 3/1967 | Graham et al. | 260—2.5 |
| 3,311,574 | 3/1967 | Bowering et al. | 260—91.1 |
| 3,402,183 | 9/1968 | Ibbotson | 260—2.5 |

MURRAY TILLMAN, Primary Examiner

W. J. BRIGGS, SR., Assistant Examiner

U.S. Cl. X.R.

260—88.3A, 91.1R, 827, 2.5AE, 2.5AM, 2.5AP, 2.5AT, 33.8UA, 33.8UB, 47UA, 62, 47CB, 78.5R, 85.7, 86.1R- 88.1R, 88.1P